United States Patent
Nishihara et al.

(10) Patent No.: US 10,055,272 B2
(45) Date of Patent: Aug. 21, 2018

(54) STORAGE SYSTEM AND METHOD FOR CONTROLLING SAME

(71) Applicant: HITACHI, LTD., Tokyo (JP)

(72) Inventors: Yusuke Nishihara, Tokyo (JP); Yuko Matsui, Tokyo (JP); Shintaro Kudo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 202 days.

(21) Appl. No.: 15/027,830

(22) PCT Filed: Oct. 24, 2013

(86) PCT No.: PCT/JP2013/078865
§ 371 (c)(1),
(2) Date: Apr. 7, 2016

(87) PCT Pub. No.: WO2015/059804
PCT Pub. Date: Apr. 30, 2015

(65) Prior Publication Data
US 2016/0246660 A1    Aug. 25, 2016

(51) Int. Cl.
*G06F 11/07* (2006.01)
*G06F 3/06* (2006.01)
*G06F 13/38* (2006.01)
*G06F 13/14* (2006.01)
*G06F 13/00* (2006.01)

(52) U.S. Cl.
CPC .............. *G06F 11/079* (2013.01); *G06F 3/06* (2013.01); *G06F 3/0619* (2013.01); *G06F 3/0634* (2013.01); *G06F 3/0653* (2013.01); *G06F 3/0689* (2013.01); *G06F 11/076* (2013.01); *G06F 11/0727* (2013.01);
(Continued)

(58) Field of Classification Search
CPC .. G06F 11/079; G06F 11/0727; G06F 11/076; G06F 3/0619; G06F 3/0634; G06F 3/0653; G06F 3/0689; G06F 11/3051; G06F 11/327; G06F 11/34; G06F 11/3428; G06F 11/3485
See application file for complete search history.

(56) References Cited

U.S. PATENT DOCUMENTS

| 6,697,976 B1 * | 2/2004 | Satoh | G11B 20/18 |
| | | | 360/65 |
| 7,093,155 B2 * | 8/2006 | Aoki | G06F 11/2028 |
| | | | 370/225 |

(Continued)

FOREIGN PATENT DOCUMENTS

| JP | 08-96310 A | 4/1996 |
| JP | 11-296311 A | 10/1999 |

(Continued)

*Primary Examiner* — Paul Contino
(74) *Attorney, Agent, or Firm* — Volpe and Koenig, P.C.

(57) ABSTRACT

Provided is a storage system which is connected to a host computer and whereby data is read and written. The storage system comprises: a storage device which stores the data; and a storage controller wherein an error is detected by one of a plurality of first sections which are sections upon a transfer path of the data with respect to the storage device in a full check mode, an error is detected by one of second sections which are fewer than the first sections in a regular mode, and a switch is made to the full check mode when the error is detected in the regular mode.

6 Claims, 7 Drawing Sheets

(52) U.S. Cl.
CPC ............. *G06F 13/00* (2013.01); *G06F 13/14* (2013.01); *G06F 13/385* (2013.01)

(56) References Cited

U.S. PATENT DOCUMENTS

| | | | | |
|---|---|---|---|---|
| 8,051,335 | B1 * | 11/2011 | Reimers | G06F 3/061 714/43 |
| 8,566,637 | B1 * | 10/2013 | Puhov | G06F 11/0727 714/42 |
| 8,837,064 | B1 * | 9/2014 | Wu | G11B 20/10379 360/31 |
| 2007/0011513 | A1 * | 1/2007 | Biswas | G06F 11/1008 714/722 |
| 2009/0183036 | A1 * | 7/2009 | Hathorn | G06F 11/0709 714/48 |
| 2009/0217086 | A1 | 8/2009 | Tanaka et al. | |
| 2010/0185895 | A1 * | 7/2010 | Clark | G06F 11/0727 714/5.11 |
| 2011/0093625 | A1 | 4/2011 | Yoneda | |
| 2011/0179318 | A1 * | 7/2011 | Sekimoto | G06F 11/073 714/708 |
| 2013/0275651 | A1 * | 10/2013 | D'Abreu | G11C 11/5628 711/103 |
| 2014/0325294 | A1 * | 10/2014 | Chan | G06F 11/076 714/708 |

FOREIGN PATENT DOCUMENTS

| | | | |
|---|---|---|---|
| JP | 11296311 A | * | 10/1999 |
| JP | 2009-205316 A | | 9/2009 |
| JP | 2011-086244 A | | 4/2011 |
| JP | 2011-108006 A | | 6/2011 |
| JP | 2011-232910 A | | 11/2011 |

\* cited by examiner

FIG. 4

| CONTROL MEMORY IN STORAGE SYSTEM | | |
|---|---|---|
| FAULT FREQUENCY MANAGEMENT TABLE 400 | | |
| SUSPICIOUS PORTION | FAULT FREQUENCY | FAULT THRESHOLD |
| FE Chip#1 | 0 | 20 |
| CM#1 | 20 | 20 |
| CPU#1 | 0 | 20 |
| BEChip#1 | 0 | 20 |
| FE Chip#2 | 0 | 20 |
| CM#2 | 2 | 20 |
| CPU#2 | 0 | 20 |
| BEChip#2 | 0 | 20 |

| CHECK MODE MANAGEMENT TABLE 410 | |
|---|---|
| ALL CHECK MODE FLAG | ON/OFF |
| ALL CHECK MODE FREQUENCY | FREQUENCY WITH WHICH NORMAL MODE HAS BEEN CHANGED TO ALL CHECK MODE |
| ALL CHECK MODE TIME | OPERATION TIME IN ALL CHECK MODE |
| POST-CLEARING TIME | TIME ELAPSED AFTER CLEARING FAULT FREQUENCY |

F I G. 6
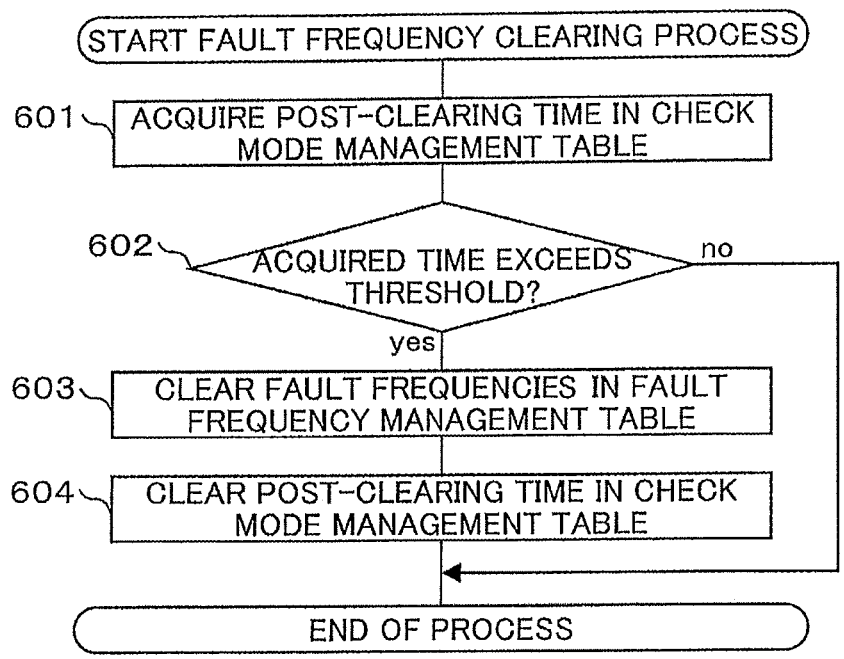

STORAGE SYSTEM AND METHOD FOR CONTROLLING SAME

TECHNICAL FIELD

The present invention relates to a storage system and method for controlling same.

BACKGROUND ART

In recent years, with increases in the variety, image quality, accuracy, and the like of information, the amount of data included in one piece of information has increased. There has also increased a demand to process an extremely large amount of data called big data when controlling social infrastructure or analyzing natural phenomena or the like. Accordingly, storage systems for storing such a great amount of data are increasing their importance. When selecting such a storage system, greater importance is placed on its performance and capacity, as well as on its reliability.

What is important with respect to the reliability of a storage system is to prevent an error from occurring in data stored in a storage device such as a disk, as well as to prevent a fault from causing an error in data being transferred within a storage system. Even when data can be correctly read from a disk or the like, if a fault occurs and causes an error in data being transferred within the storage system before outputted therefrom, a process using such data would malfunction, causing a significant problem.

What is also important with respect to the reliability of a storage system is to identify the faulty portion in the storage system. If the entire storage system is shut down due to a fault in part thereof and thus read or write of data therefrom or thereto becomes impossible, the process using the data is delayed, significantly affecting use of the storage system.

For example, PTL1 discloses a technology which quickly calculates an error correction code (ECC), which is also used to detect an error in data, by using hardware in place of software, which has been used traditionally.

CITATION LIST

Patent Literature

PTL 1: Japanese Patent Application Publication No. 08-096310

SUMMARY OF INVENTION

Technical Problem

By applying the technology disclosed in PTL1 to a storage system, that is, by disposing pieces of hardware for quickly calculating an ECC in multiple portions, it is possible to detect an error and to identify the faulty portion in the storage system. However, this disadvantageously requires many pieces of hardware for quickly calculating an ECC and thus increases the cost of the storage system.

In view of the foregoing, the present invention aims to identify the faulty portion while preventing an increase in cost, as well as to reduce performance degradation resulting from an error detection process.

Solution to Problem

The present invention provides a storage system which is coupled to a host computer and from or to which data is read or written. The storage system includes: a storage device configured to store the data; and a storage controller, wherein, in all check mode, one of first portions detects an error, the first portions being multiple portions on a path over which data is transferred from or to the storage device; in normal mode, one of second portions detects an error, the number of second portions being smaller than the number of the first portions; and when an error is detected in the normal mode, the normal mode is changed to the all check mode.

In the storage system according to the present invention, the storage controller includes a first chip coupled to the host computer and a second chip coupled to the storage device, and the first and second chips detect an error as the second portions.

In the storage system according to the present invention, the storage controller includes a CPU, and first chip, second chip, and the CPU software processing detect an error as the first portions.

The present invention is also grasped as a method for controlling a storage system.

Advantageous Effects of Invention

According to the present invention, many pieces of error detection hardware are not disposed, and only when necessary, the CPU executes software to increase the number of error detection portions. Thus, it is possible to identify the faulty portion through detection of an error while preventing an increase in cost. Further, since an error detection process is less frequently performed in normal times, performance degradation can be reduced.

BRIEF DESCRIPTION OF DRAWINGS

FIG. 4 is a diagram showing an example of information stored in a control memory of a storage system;

FIG. 6 is a diagram showing an example of the flow of a fault frequency clearing process.

DESCRIPTION OF EMBODIMENTS

Now, a preferred storage system and a control method thereof will be described in detail with reference to the accompanying drawings.

Figure 1:
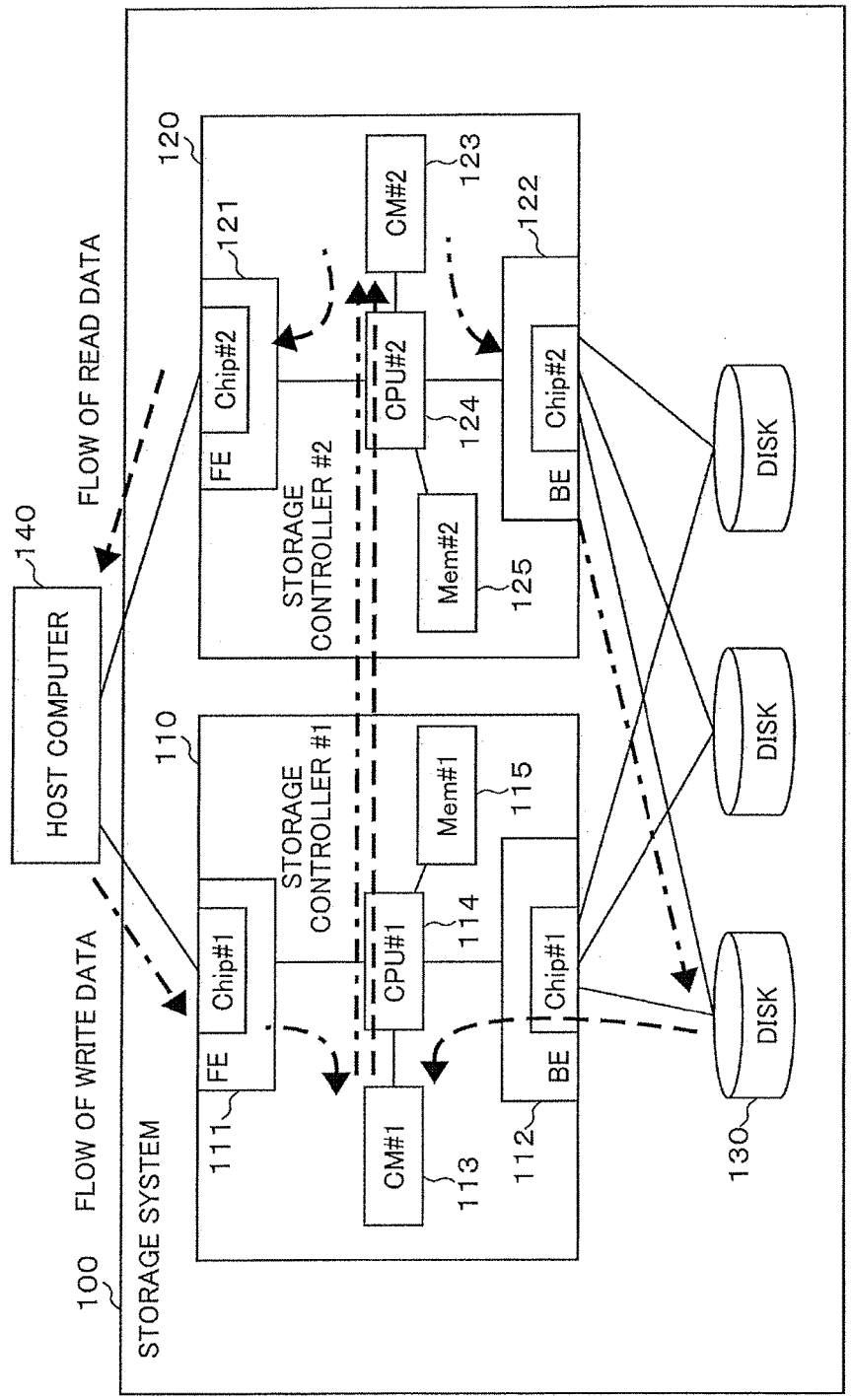
FIG. 1 is a diagram showing an example configuration of a storage system.

FIG. 1 is a diagram showing an example configuration of a storage system. A storage system 100 is coupled to a host computer 140 and includes a storage controller #1 110, a storage controller #2 120, and multiple disks 130. The number of storage controllers may be three or more. The storage controller #1 110 includes an FE (front end) chip #1 111, a BE (back end) chip #1 112, a CM (cache memory) #1 113, a CPU (central processing unit) #1 114, and a Mem (memory) #1 115. The FE chip #1 111 is a circuit for coupling the storage controller #1 110 with the host computer 140 by the Fibre Channel, iSCSI, or the like. The BE chip #1 112 is a circuit for coupling the disks 130 with the storage controller #1 110 by the Fibre Channel, SATA, SAS, or the like. The CM #1 113 is a memory for caching data transferred between the FE chip #1 111 and the BE chip #1 112. It temporarily stores write data being transferred from the FE chip #1 111 to the BE chip #1 112 or provides read data required by the FE chip #1 111. The specification used to couple the FE chip #1 111 with the BE chip #1 112 is not limited to that described above and may be of any type as long as the specification allows coupling with the disks. The CM #1 113 may be controlled by any type of cache control method. The CPU #1 114 controls data transfer among the FE chip #1 111, the BE chip #1 112, and the CM #1 113, as well as controls the entire storage controller #1 110 on the basis of management information stored in the Mem #1 115. Instead of providing the Mem #1 115 separately, the information stored in the Mem #1 115 may be stored in the CM #1 113 or in a memory of the CPU #1 114. The disks 130 may be magnetic disk storage devices, semiconductor storage devices, or the like.

According to the storage controller #1 110 thus configured, when the host computer 140 transmits a data read request to the storage controller #1 110, it is possible to read data which is temporarily stored in the CM #1 113 or to read data from any disk 130 through the BE chip #1 112 and then to transmit the read data from the FE chip #1 111 to the host computer 140.

The storage controller #2 120 has the same configuration as the storage controller #1 110 and is coupled to the host computer 140 and the disks 130. The storage controller #1 110 and the storage controller #2 120 are coupled together through the CPU #1 114 and a CPU #2 124 so that data can be transferred between the storage controllers. Thus, in cases such as where the communication between the host computer 140 and the storage controller #1 110 is under a high load or is a failure, the host computer 140 can communicate with the disks 130 through the storage controller #2 120. Similarly, in cases such as where the communication between the storage controller #2 120 and the disks 130 is under a high load or is a failure, or where a BE chip #2 122 is under a high load, the host computer 140 can communicate with the disks 130 through the BE chip #1 112 of the storage controller #1 110.

The storage system 100 has normal mode and all check mode. The method for checking a fault varies between normal mode and all check mode.

First, referring to a broken-line arrow shown in FIG. 1 and FIG. 2, a process of reading data through both storage controllers in normal mode will be described. The BE chip #1 112 reads data from any disk 130 (step 201). For example, the BE chip #1 112 may issue a read request to the disk 130 and then read data therefrom. The BE chip #1 112 checks the assurance code of the read data (step 202). If the BE chip #1 112 detects any error, the process proceeds to step 210. A fault management process in step 210 will be described later with reference to FIG. 5. If the BE chip #1 112 detects no error, it transfers the read data to the CM #1 113 (step 204). In this case, the BE chip #1 112 may directly write the read data to the CM #1 113, or may write the data to the CM #1 113 through a memory controller (not shown) or the like.

The CM #1 113 then temporarily stores the read data and then the CPU #1 114 and the CPU #2 124 transfer the read data to the CM #2 123 (step 205). The read data is temporarily stored in the CM #2 123 and then transferred to an FE chip #2 121 (step 206). In this case, the FE chip #2 121 may read the data from the CM #2 123, or a memory controller (not shown) or the like may read the data from the CM #2 123 and transfer it to the FE chip #2 121. The FE chip #2 121 checks the assurance code of the transferred data (step 207). If the FE chip #2 121 detects any error, the process proceeds to step 210. If the FE chip #2 121 detects no error, it transmits the data to the host computer 140 (step 209).

As seen above, the FE chip #2 121 checks the assurance code of the data. Thus, even when a fault occurs in the storage system 100 and causes an error in the data, the FE chip #2 121 can detect the error and prevent the data including the error from being transmitted to the host computer 140. Further, since it is only necessary to check the assurance code of the data twice using the hardware portions, the process can be performed quickly.

Next, referring to FIG. 3, a process of reading data through both storage controllers in all check mode will be described. The data flow is the same as that in normal mode, which is shown by the broken-line arrow in FIG. 1. The process flow from steps 201 to 204 is the same as that described in FIG. 2. The CM #1 113 temporarily stores the read data, and the CPU #1 114 checks the assurance code of the data by executing software (not shown) (step 301). This check may be performed on the data stored in the CM #1 113 before subsequent step 205, or may be performed on the data read from the CM #1 113 when transferred to the CM #2 123 in step 205. If the CPU #1 114 detects any error, the process proceeds to step 210. If the CPU #1 114 detects no error, the data is transferred from the CM #1 113 to the CM #2 123 in step 205. Then the CPU #2 124 checks the assurance code of the data by executing software (not shown) (step 303). This check may also be performed before subsequent step 206 or may be performed on the data read in step 206. If the CPU #2 124 detects any error, the process proceeds to step 210. If the CPU #2 124 detects no error, the process proceeds to step 206. The process flow from steps 206 to 209 is the same as that described in FIG. 2.

In addition to the checks in normal mode, the following checks are performed in all check mode: the CPU #1 114 checks the assurance code of the data stored in the CM #1 113; and the CPU #2 124 checks the assurance code of the data stored in the CM #2 123. Thus, although the processing time for checking is increased, it is possible to identify the faulty portion in the storage system 100.

The flow of a data write process in a case where the communication between the host computer 140 and the storage controller #2 120 is not used is shown by a dot-and-dash line arrow in FIG. 1. The flow of write data differs from the flow of read data only in direction, and write data is checked in normal mode and in all check mode in the same way that read data is checked. Typically, a CPU includes a simple ECC processing circuit which allows 2-bit error detection, 1-bit error correction, or the like. However, such an ECC processing circuit cannot detect 3-bit or more error stably. For this reason, instead of using such an ECC processing circuit, the CPU according to the present embodiment may process an assurance code corresponding to multiple bits by using software. Thus, the CPU can detect an error stably.

Referring to FIG. 4, information used in the fault management process will be described. Information shown in FIG. 4 is stored in a control memory of the storage system 100, for example, in the Mem #1 115, a Mem #2 125, or the like. A fault frequency management table 400 is a table storing fault frequencies 402 and fault thresholds 403 corresponding to suspicious portions 401, respectively. The suspicious portions 401 are components of the storage system 100 shown in FIG. 1. For example, information on the FE chip #1 111 is stored in a row 404 of the table. The frequency of faults detected in each suspicious portion 401 and a fault frequency threshold which is preset with respect to the suspicious portion are stored in a fault frequency 402 and a fault threshold 403, respectively. All the fault frequencies 402 are cleared to zero when the storage system 100 is powered on.

The fact that an error has been detected in one suspicious portion 401 means that a fault has occurred in that portion or in a portion preceding the portion. For example, if the FE chip #2 121 detects an error in the flow of the read data shown in FIG. 1, the portion in which a fault has occurred is one of the FE chip #2 121 itself and the CPU #2 124, which has transmitted the read data received by the FE chip #2 121, or a preceding component. While no error has been detected in the read data temporarily stored in the CM #2 123 in the course of transfer, the FE chip #2 121 has detected the error. Accordingly, the FE chip #2 121 is regarded as a suspicious faulty portion. As seen above, the CPU #1 114 and the CPU #2 124 can detect whether any fault has occurred in the CM #1 113 and the CM #2 123, respectively, using the assurance code of the data, as well as can detect whether any fault has occurred in themselves, respectively.

A check mode management table 410 is a table for managing all check mode. An all check mode flag 411 represents ON, where all check mode is performed, or OFF, where normal mode is performed. An all check mode frequency 412 represents the frequency with which normal mode has been changed to all check mode after power-on of the storage system 100. An all check mode time 413 represents an all check mode operation time, which is a time elapsed after change of normal mode to all check mode. A post-clearing time 414 represents a time elapsed after clearing the fault frequency to zero (to be discussed later with reference to FIG. 6) or a time elapsed after clearing the fault frequency by powering on the storage system 100.

Figure 2:
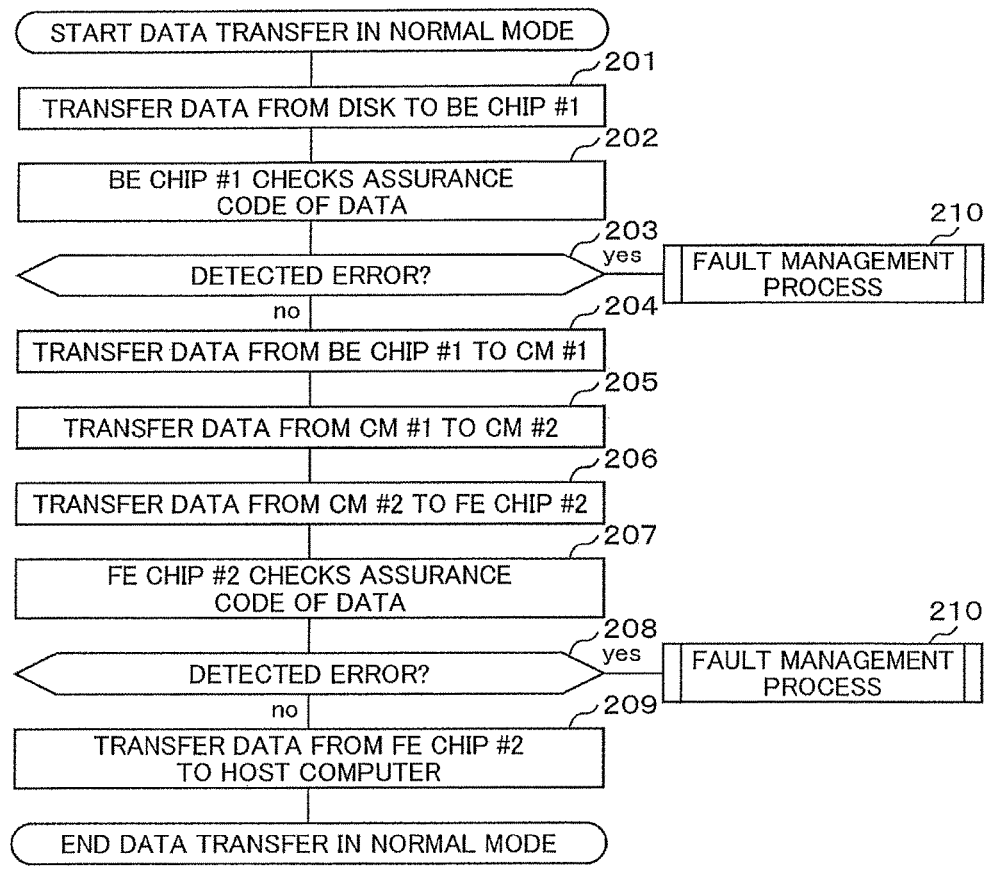
FIG. 2 is a diagram showing an example of the flow of a process of transferring read data in normal mode.
Figure 3:
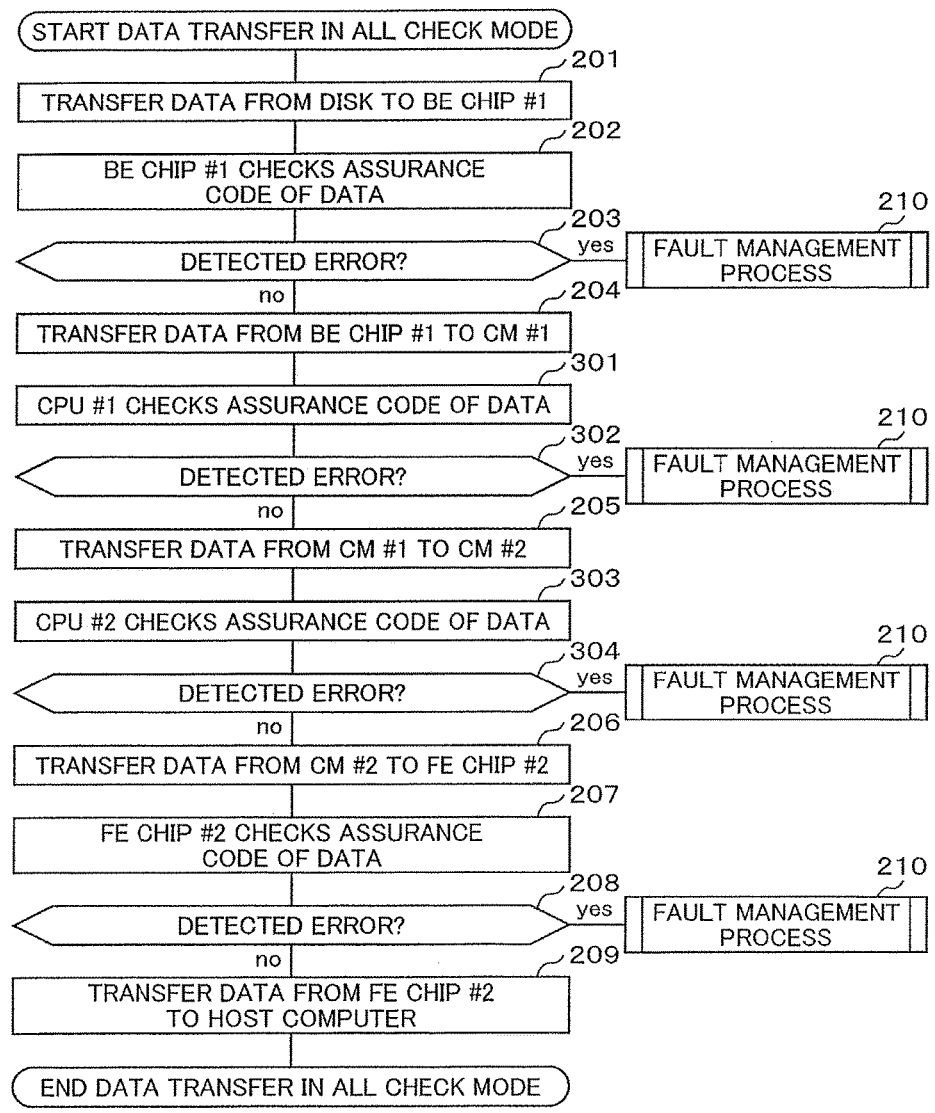
FIG. 3 is a diagram showing an example of the flow of a process of transferring read data in all check mode.
Figure 5:
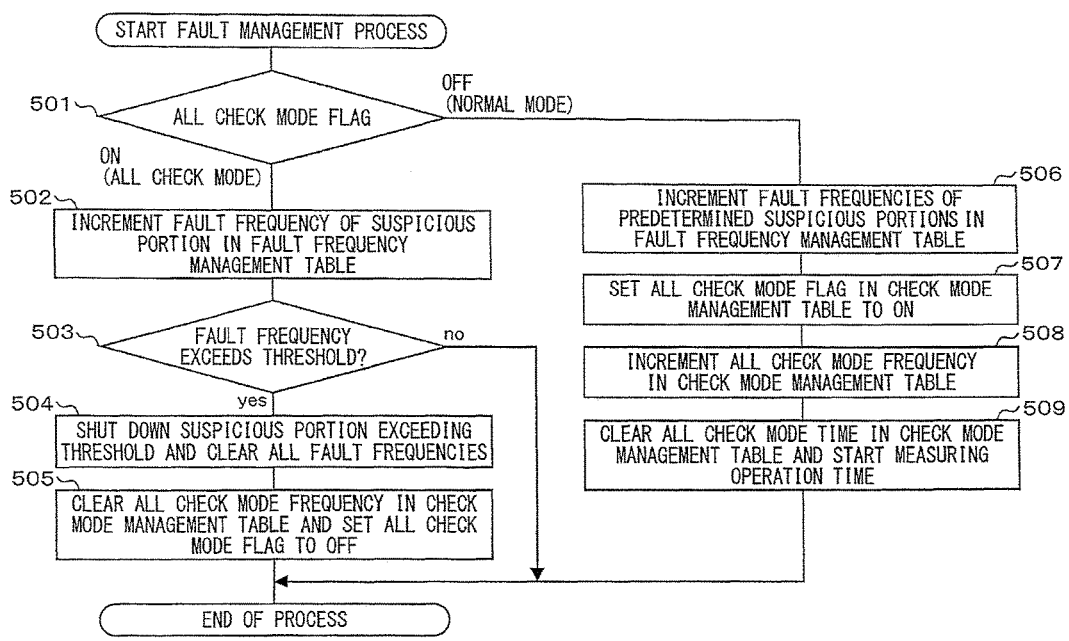
FIG. 5 is a diagram showing an example of the flow of a fault management process.

FIG. 5 is a diagram showing an example of the flow of a fault management process corresponding to step 210 of FIGS. 2 and 3. This process flow may be performed by the CPU #1 114, CPU #2 124, or the like. When an error is detected, step 210 is performed. First, it is determined whether the all check mode flag 411 of the check mode management table 410 is ON or OFF (step 501). If the all check mode flag 411 is ON, all check mode is being performed. Accordingly, a fault frequency 402 corresponding to a suspicious portion 401 in the fault frequency management table 400 corresponding to the step where the error has been detected using the assurance code of the data is incremented (step 502). For example, if an error is detected in step 203 of FIG. 3, a fault frequency 402 in a row 405 corresponding to the suspicious portion 401, the BE chip #1 112, is incremented by a predetermined value. The predetermined value by which the failure frequency 402 is incremented will be described later.

Then it is determined whether the fault frequency 402 has exceeded the corresponding fault threshold 403 through this increment (step 503). If the fault frequency 402 has exceeded the fault threshold 403, the suspicious portion is regarded as a portion to be shut down (blocked) and is then shut down. Further, since other fault frequencies 402 may also have been incremented under the influence of this suspicious portion, all the fault frequencies 402 are cleared to zero once (step 504). At this time, a notification indicating that the suspicious portion has been shut down may be transmitted to the administrator. Then the all check mode frequency 412 is also cleared to zero, and the all check mode flag 411 is set to OFF to change all check mode to normal mode (step 505), ending the fault management process. If the fault frequency 402 has not exceeded the fault threshold 403 in step 503, the fault management process is ended, since monitoring should be continued in all check mode.

If the all check mode flag 411 is OFF in step 501, normal mode is being performed, that is, the assurance code of the data is checked less frequently. Accordingly, the number of suspicious portions cannot be narrowed to one. For this reason, fault frequencies 402 corresponding to predetermined suspicious portions 401 corresponding to the step where an error has been detected by checking the assurance code of the data are incremented (step 506). For example, if an error is detected in step 208 of FIG. 2, all portions on the path from the FE chip #2 121 to the BE chip #1 112 are suspicious and therefore regarded as predetermined suspicious portions. Accordingly, all fault frequencies 402 in rows 406 to 407 corresponding to these predetermined suspicious portions 401 are incremented.

If an error is detected in normal mode even once, the all check mode flag 411 is set to ON to change normal mode to all check mode in order to identify the faulty portion (step 507). Further, the all check mode frequency 412 is incremented by 1 (step 508), and the all check mode time 413 is cleared to zero to start measuring an all check mode operation time (step 509), ending the fault management process.

The fault management process shown in FIG. 5 is a process related to management. On the other hand, if correct data can be restored using the assurance code of the data, the data processing may be continued by restoring the correct data. That is, if an error is detected in step 203 shown in FIG. 2 and if correct data can be restored, the process may return from step 210 by restoring the correct data and then proceed to steps 204 and later. If correct data cannot be restored, the process may return to step 201 so that the process is performed again, or the data including the error may be discarded without doing anything and then the process may be performed again from step 201 in response to the host making a retry upon time-out.

The value by which the fault frequency is incremented in all check mode (step 502) differs from the value by which the fault frequency is incremented in normal mode (step 506). While the faulty portion can be identified in all check mode, only the range in which the fault has occurred can be identified in normal mode. Accordingly, the increment value in all check mode is set to a value greater than the increment value in normal mode. For example, the increment value in all check mode is set to 10, and the increment value in normal mode is set to 1 or the like. Further, in all check mode, checks are performed more frequently and thus the processing load is increased, affecting the performance. For this reason, if any fault cannot be identified even when all check mode is continued for a certain period of time, all check mode is changed to normal mode (this will be described later). If a fault occurs intermittently, the fault is difficult to identify. For this reason, even in normal mode, the fault frequency of the suspicious range is incremented by a value smaller than the increment value in all check mode. Thus, after normal mode is changed to all check mode, the threshold can be reached with a lower fault frequency. In this case, the increment value in normal mode may be the value of the all check mode frequency 412. A large value of the all check mode frequency 412 means that although any fault cannot be identified in all check mode, the fault frequency in normal mode is high. Accordingly, by incrementing the fault frequency by the value of the all check mode frequency 412, it is possible to exceed the threshold in all check mode even with a small increment value. Thus, a fault can be identified easily. Note that when the incremented fault frequency exceeds the threshold in normal mode, a fault is identified as a range. For this reason, the increment of the fault frequency may be controlled as follows: if the fault frequency is estimated to exceed the threshold when incremented in step 506, the increment is cancelled, or the increment is performed and then subtraction is performed to restore the fault frequency to the previous value. Thus, the threshold is exceeded not in normal mode but in all check mode. With respect to the increment of the all check mode frequency 412 of step 508, an upper limit of the incremented value may be set. A value smaller than the value incremented in all check mode, for example, half the value incremented in all check mode may be set as an upper value.

Referring to FIG. 6, there will be described a process of clearing the fault frequency 402 in the fault frequency management table 400 to zero. For example, the specification of a PCI-Express® bus or the like states that an error occurs with a predetermined probability when the bus is used. Accordingly, even if the bus properly operates to the specification, the fault frequency 402 thereof is gradually incremented and, after a long time lapse, the threshold may be exceeded and thus the bus may be identified as a fault. For this reason, a fault frequency 402 which does not reach the threshold even after a predetermined time lapse is not regarded as a fault and is cleared to zero every predetermined time. First, the post-clearing time 414 in the check mode management table 410 is acquired (step 601) and then it is determined whether the acquired time exceeds the threshold (step 602). The threshold is previously set to, e.g., 24 hours but not limited thereto and is previously set according to the specification of hardware, the amount of data to be transferred, or the like. When the acquired time exceeds the threshold, it is determined that although a long time has elapsed, no portion has caused many errors to the extent that the portion needs to be shut down and then the all the failure frequencies 402 in the failure frequency management table 400 are cleared to zero (step 603). Then the post-clearing time 414 in the check mode management table 410 is cleared to zero, ending the process (step 604). Then the time is measured again. If the fault frequency 402 is not zero before cleared to zero, the value may be stored as a log or transmitted to the administrator. If the acquired time does not exceed the threshold, the process is ended, and the measurement of the time is continued. Note that the process of clearing the fault frequency 402 to zero is performed independently of, for example, the processes in FIGS. 2, 3, and the like. Concurrently with clearing the fault frequency 402 to zero, the all check mode frequency 412 may be cleared to zero.

Figure 7:
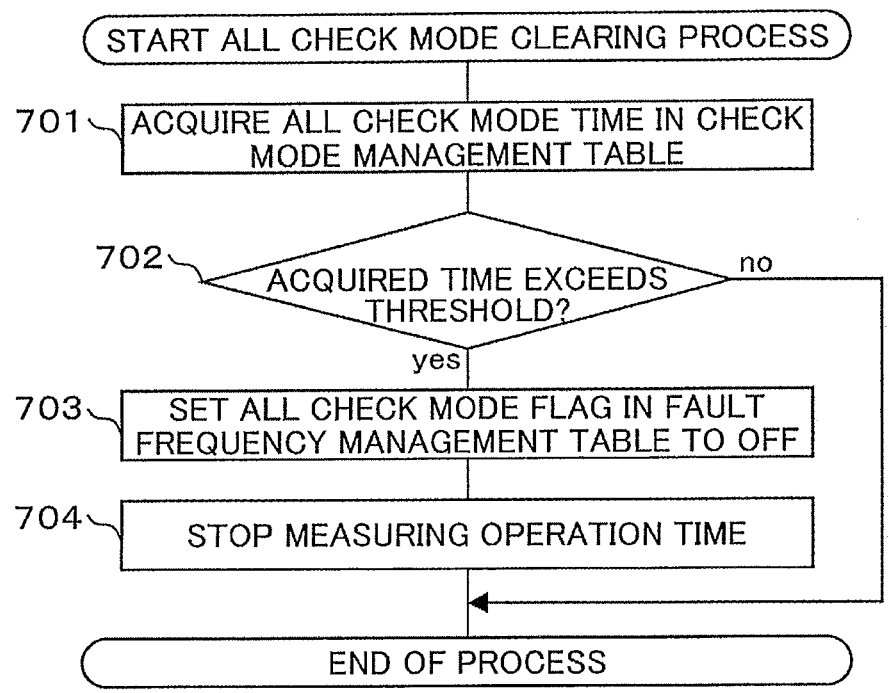
FIG. 7 is a diagram showing an example of the flow of an all check mode clearing process.

Referring to FIG. 7, there will be described a process of clearing the all check mode time 413 in the check mode management table 410 to zero. In all check mode, the assurance code of the data is checked more frequently, so that the processing load is increased. For this reason, when an error is detected, normal mode is changed to all check mode and, if no error is detected even after a predetermined time lapse, it is determined that the error has been caused by an intermittent fault, and all check mode is restored to normal mode. Thus, all check mode is prevented from being continued in a state where any error is not detected. First, the all check mode time 413 in the check mode management table 410 is acquired (step 701) and then it is determined whether the acquired time exceeds the threshold (step 702). The threshold is previously set to, e.g., 1 hour but not limited thereto and is previously set according to the specification of hardware, the amount of data to be transferred, or the like. If the acquired time exceeds the threshold, it can be determined that the error has been caused by an intermittent fault.

Accordingly, the all check mode flag in the check mode management table 410 is set to OFF to change all check mode to normal mode (step 703), and the measurement of the operation time is stopped (step 704). In contrast to this process, as described above with reference to FIG. 5, the all check mode time 413 is cleared to zero in step 509, so that measurement of the operation time is started. If the acquired time does not exceed the threshold, the process is ended, so that the measurement of the time is continued. Note that the process of clearing the all check mode time 413 to zero is performed independently of, for example, the processes in FIGS. 2, 3, and the like.

As described above, during operation in normal mode, the FE and BE chips alone detect an error; the CPUs do not detect an error. Thus, the processing load can be reduced. During operation in all check mode, on the other hand, the FE and BE chips, as well as the CPUs detect an error. Thus, it is possible to identify the faulty portion which has caused an error, as well as to prevent an increase in cost resulting from disposition of many hardware portions for error detection. Further, the faulty portion is shut down in all check mode, and the fault frequency is cleared every predetermined time. Thus, a portion where a fault occurs intermittently is not shut down, and a portion where no fault has occurred is prevented from being erroneously shut down.

REFERENCE SIGNS LIST

100 Storage system
110, 120 Storage controller
111, 121 FE (Front End) Chip
112, 122 BE (Back End) Chip
113, 123 CM (Cache Memory)
114, 124 CPU (Central Processing Unit)
115, 125 Mem (Memory)
130 Disk
400 Fault frequency management table
410 Check mode management table

The invention claimed is:

1. A storage system which is coupled to a host computer and from or to which data is read or written, the storage system comprising:
   a storage device configured to store the data; and
   a storage controller,
   wherein, in all check mode, when one of first portions detects an error, the first portions being a plurality of portions through which data sequentially passes from or to the storage device, the storage controller increments a value regarding detection of the one first portion by a first value, and clears the value regarding detection after a first time elapses without the value regarding detection exceeding a predetermined threshold; in normal mode, when one of second portions detects an error, the number of second portions being smaller than the number of the first portions, the storage controller increments, by a second value smaller than the first value, the respective values regarding detection of the one second portion and a portion through which the data has passed prior to passing through the one second portion; and when an error is detected in the normal mode, the normal mode is changed to the all check mode, and
   wherein the storage controller detects that the value regarding detection has exceeded the threshold in the all check mode, shuts down the one first portion which has detected the error, and notifies an administrator that the one first portion has been shut down.

2. The storage system according to claim 1,
wherein the storage controller includes a first chip coupled to the host computer and a second chip coupled to the storage device, and
wherein the first and second chips detect an error as the second portions.

3. The storage system according to claim 2,
wherein the storage controller includes a CPU, and
wherein the first chip, the second chip, and the CPU software processing detect an error as the first portions.

4. The storage system according to claim 3,
wherein the storage controller includes a cache memory, and
wherein the CPU detects an error in the cache memory through software processing.

5. The storage system according to claim 1,
wherein the storage system includes a plurality of storage controllers, and
wherein the first and second portions are set in such a manner to extend over the storage controllers.

6. A method for controlling a storage system which is coupled to a host computer and from or to which data is read or written, the storage system comprising a storage controller and a storage device, the method comprising:

in all check mode, detecting an error by one of first portions in the storage controller, the first portions being a plurality of portions through which data sequentially passes from or to the storage device, incrementing a value regarding detection of the one first portion by a first value, and clearing the value regarding detection after a first time elapses without the value regarding detection exceeding a predetermined threshold;

in normal mode, detecting an error by one of second portions in the storage controller, the number of second portions being smaller than the number of the first portions, incrementing, by a second value smaller than the first value, the respective values regarding detection of the one second portion and a portion through which the data has passed prior to passing through the one second portion; and when an error is detected in the normal mode, changing the normal mode to the all check mode, and wherein the storage controller detects that the value regarding detection has exceeded the threshold in the all check mode, shuts down the one first portion which has detected the error, and notifies an administrator that the one first portion has been shut down.

* * * * *